United States Patent
Steel et al.

(10) Patent No.: US 10,208,626 B2
(45) Date of Patent: Feb. 19, 2019

(54) GAS TURBINE MANIFOLD MOUNTING ARRANGEMENT INCLUDING A CLEVIS

(75) Inventors: Glyn Steel, Belper (GB); John R. Howarth, Belper (GB)

(73) Assignee: ROLLS-ROYCE plc, London (GB)

( * ) Notice: Subject to any disclaimer, the term of this patent is extended or adjusted under 35 U.S.C. 154(b) by 2003 days.

(21) Appl. No.: 13/177,112

(22) Filed: Jul. 6, 2011

(65) Prior Publication Data
US 2012/0042660 A1 Feb. 23, 2012

(30) Foreign Application Priority Data
Aug. 17, 2010 (GB) .................... 1013723.0

(51) Int. Cl.
| F01D 25/28 | (2006.01) |
| F01D 11/24 | (2006.01) |
| F02C 7/047 | (2006.01) |
| F02C 7/22 | (2006.01) |

(52) U.S. Cl.
CPC .............. *F01D 25/28* (2013.01); *F01D 11/24* (2013.01); *F02C 7/047* (2013.01); *F02C 7/22* (2013.01); *F05D 2230/60* (2013.01)

(58) Field of Classification Search
CPC ....... F01D 11/24; F01D 25/28; F05D 2230/60
USPC ..................... 60/792, 796, 798; 248/62, 65; 415/173.1, 173.2
See application file for complete search history.

(56) References Cited

U.S. PATENT DOCUMENTS

| 1,819,754 | A | * | 8/1931 | Mott ............................. 248/62 |
| 3,866,871 | A | * | 2/1975 | Dupuy, Sr. ..................... 248/59 |
| 3,907,458 | A | | 9/1975 | Liddle |
| 4,134,255 | A | * | 1/1979 | McBain et al. ................... 59/78 |
| 4,592,200 | A | | 6/1986 | Benoist et al. |
| 4,979,872 | A | | 12/1990 | Myers et al. |
| 5,100,291 | A | * | 3/1992 | Glover ......................... 415/115 |
| 5,127,224 | A | * | 7/1992 | Barcza et al. .................. 60/763 |
| 5,918,680 | A | * | 7/1999 | Maranghides ..... A62C 99/0072 169/16 |
| 6,089,821 | A | | 7/2000 | Maguire et al. |
| 6,185,925 | B1 | | 2/2001 | Proctor et al. |
| 6,443,233 | B1 | * | 9/2002 | Aebischer ................ A62C 5/00 169/11 |
| 6,896,038 | B2 | | 5/2005 | Arilla et al. |
| 7,114,914 | B2 | * | 10/2006 | Gendraud et al. ............ 415/108 |

(Continued)

FOREIGN PATENT DOCUMENTS

| EP | 1 609 954 A1 | 12/2005 |
| EP | 2 243 931 A2 | 10/2010 |

OTHER PUBLICATIONS

Giancoli, D. C., Physics for Scientists & Engineers, Fourth Edition, Pearson Education, Inc., Upper Saddle River, NJ 2008, pp. 318-319.*

(Continued)

*Primary Examiner* — Lorne Meade
(74) *Attorney, Agent, or Firm* — Oliff PLC

(57) ABSTRACT

A manifold mounting arrangement comprising: a discrete manifold module; a clevis arrangement having a clevis straddling a flange and pivotally secured to the flange by a clevis pin; and a locking bar configured to be coupled to the clevis and to constrain the manifold module relative to the clevis arrangement in the locality of the locking bar. The invention finds utility for mounting case cooling manifolds to turbine casing for a gas turbine engine.

13 Claims, 3 Drawing Sheets

(56) References Cited

U.S. PATENT DOCUMENTS

| | | | |
|---|---|---|---|
| 7,287,955 B2* | 10/2007 | Amiot et al. | 415/173.2 |
| 7,491,029 B2* | 2/2009 | Pezzetti et al. | 415/1 |
| 7,597,537 B2* | 10/2009 | Bucaro et al. | 415/173.2 |
| 7,857,585 B2* | 12/2010 | Dhaliwal | 415/213.1 |
| 8,152,446 B2* | 4/2012 | Zhang et al. | 415/108 |
| 8,434,997 B2* | 5/2013 | Pinero et al. | 415/115 |
| 8,668,438 B2* | 3/2014 | Saroi | 415/116 |
| 2006/0016173 A1 | 1/2006 | Dhaliwal | |
| 2006/0180713 A1* | 8/2006 | Olle et al. | 248/58 |
| 2006/0272330 A1 | 12/2006 | Lewis et al. | |
| 2009/0053035 A1 | 2/2009 | Zhang et al. | |
| 2010/0266393 A1 | 10/2010 | Saroi | |

OTHER PUBLICATIONS

Gulf State Hangers and Supports Manufacturers, Inc., 2002 Catalog, Theodore, AL, pp. 1-173.*
Artim, Nick, "An Introduction to Automatic Fire Sprinklers, Part 1", WAAC Newsletter, vol. 16, No. 3, Sep. 1994, pp. 1-14.*
Erico, "Fire Sprinkler Hanging & Bracing Products", ERICO International Corporation, 2008, pp. 1-128.*
Dieken, D., "Gas Turbine Fire Protection", Power Engineering, vol. 102, Issue 4, Apr. 1, 1998, pp. 1-6.*
Dominique Dieken P.E., "Gas Turbine Fire Protection", Power Engineering, vol. 102, Issue 4, Apr. 1, 1998.*
Jun. 18, 2013 European Search Report issued in European Patent Application No. EP 11 17 2844.
Dec. 14, 2010 Search Report issued in European Patent Application No. GB1013723.0.
Jul. 16, 2009 Search Report issued in corresponding British Patent Application No. 0906478.3.

* cited by examiner

GAS TURBINE MANIFOLD MOUNTING ARRANGEMENT INCLUDING A CLEVIS

The present invention relates to a manifold mounting arrangement, particularly, but not exclusively, for mounting a turbine case cooling manifold arrangement in a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

In order to improve efficiency of the gas turbine engine 10, it is necessary to impingement cool the casing surrounding turbine stages to minimise the gap between the turbine blade tips and the casing. This is particularly necessary for the high pressure turbine 22 and intermediate pressure turbine 24. Thus air is diverted from the bypass duct 32 into a cooling air manifold for each turbine 22, 24. Each manifold has spray bars coupled to it to impinge the cooling air onto the casing of the turbine 22, 24.

Typically the turbine casing comprises at least one annular dummy flange on its exterior surface. A conventional cooling air manifold, considered in cross-section, is box-shaped with a rectangular cut away in its radially inner face that fits over the flange. To fix the manifold to the casing, an anti-fret liner is placed over the flange and then a W-shaped bracket is positioned over the liner and held in position by a pin through the bracket, liner and flange. The manifold is then bolted to the W bracket at its axial sides. A plurality of such mountings is provided around the casing; typically eight for a large gas turbine engine 10.

One problem of this conventional manifold mounting arrangement is that the necessary provision of clearances between the bracket, liner and pin and between the bracket and manifold leads to a large overall tolerance in the distance between the impingement holes in the spray bars and the casing. Furthermore, there is a tendency for the manifold to sit upon the mounting arrangements around the top of the engine 10 and to hang from the mounting arrangements around the bottom of the engine 10. Thus the distance between the impingement holes and the casing is greater at the bottom of the engine 10 than at the top. Consequently the cooling is not even around the engine 10 and therefore the gap between the turbine blades and the casing is also not even, resulting in uneven and inefficient engine operation.

Another disadvantage of the conventional mounting arrangement is that it is comprised of several parts. Consequently, the mounting arrangement is relatively heavy and has a substantial number of failure modes to consider and to mitigate.

A further disadvantage of this conventional mounting arrangement is that each W-shaped bracket is relatively extensive in the circumferential direction. There can be no impingement cooling of the casing at the position of the mounting arrangement because the W-shaped bracket covers the radially inner surface of the manifold.

The present invention provides a manifold mounting arrangement that seeks to address the aforementioned problems.

Accordingly the present invention provides a manifold mounting arrangement comprising: a discrete manifold module; a clevis arrangement having a clevis straddling a flange and pivotally secured to the flange by a clevis pin; and a locking bar configured to be coupled to the clevis and to constrain the manifold module relative to the clevis arrangement in the locality of the locking bar. Advantageously this arrangement offers more accurate spacing of the manifold module from a casing to which it is attached and therefore enables more accurate impingement cooling.

The manifold mounting arrangement may comprise a clevis arrangement and a locking bar at each end of the manifold module. There may be a plurality of manifold modules.

The clevis pin may be held to the clevis by a split spring pin.

At least a portion of the clevis may be threaded and the locking bar may be coupled thereto by a threaded nut.

The manifold module may be configured to have a first portion and a second portion, one on each side of the flange.

The locking bar may be configured to constrain the first and second portions relative to each other and to the clevis arrangement.

The present invention also provides a turbine case cooling arrangement comprising an annular array of manifold mounting arrangements as described above. The turbine case cooling arrangement may further comprise a circumferential feed duct having rigid portions each coupled to a manifold module by an air transfer box, adjacent rigid portions coupled by flexible portions, wherein the first and second portions of the manifold modules comprise spray bars.

The present invention also provides a gas turbine engine comprising a manifold mounting arrangement as described and a gas turbine engine comprising a turbine case cooling arrangement as described.

The present invention will be more fully described by way of example with reference to the accompanying drawings, in which.

Figure 1:
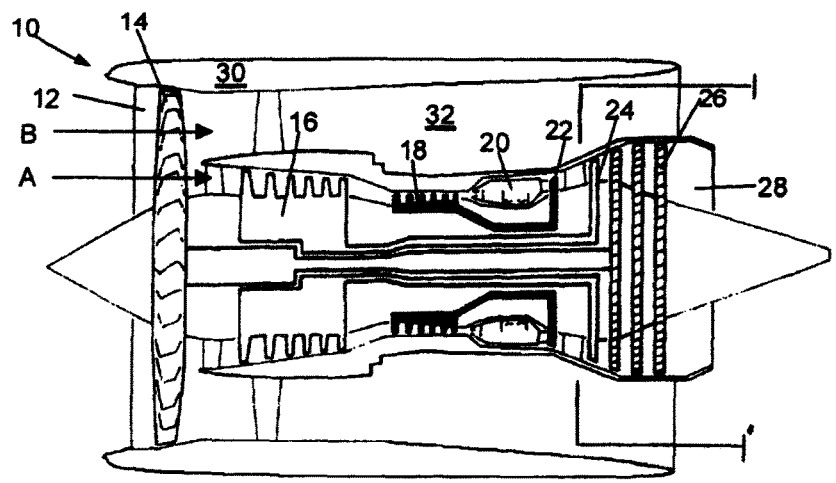
FIG. 1 is a sectional side view of a gas turbine engine.
Figure 2:
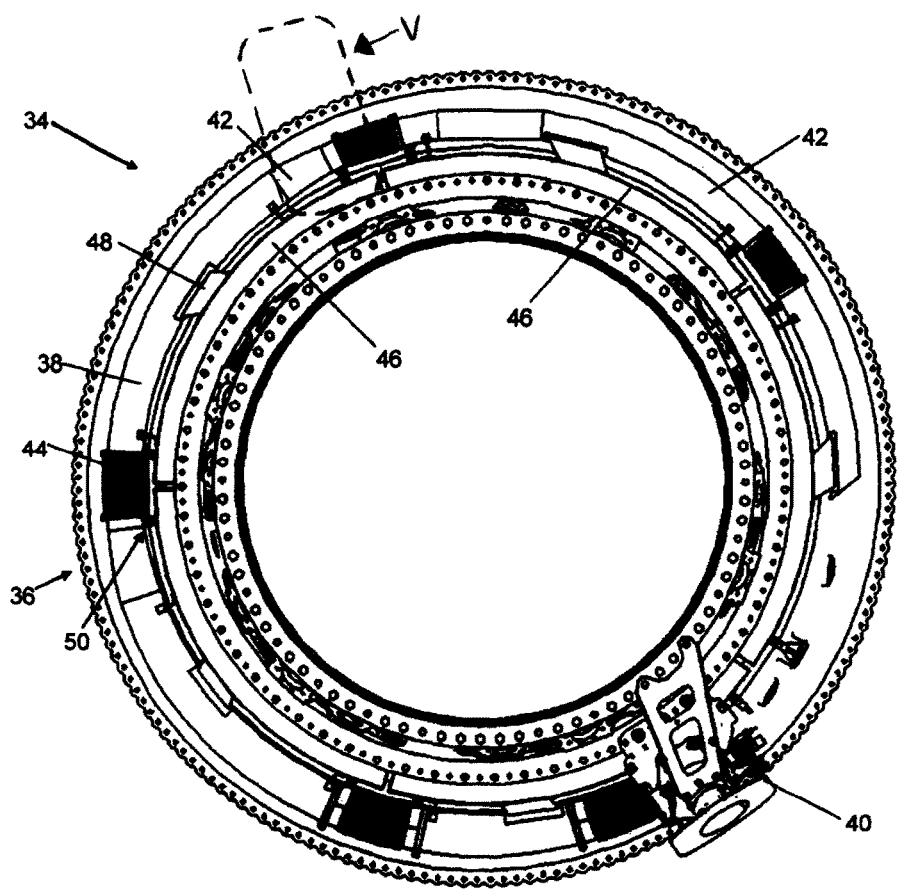
FIG. 2 is a schematic cross-section of the gas turbine engine turbine stage taken along line I-I' in FIG. 1 comprising a plurality of manifold mounting arrangements according to the present invention.

FIG. 2 shows an intermediate pressure turbine casing 34 of a gas turbine engine 10. The casing 34 includes a turbine case cooling arrangement 36 that comprises a circumferential feed duct 38 that is fed from a supply port 40. The circumferential feed duct 38 is partially annular with the supply port 40 connected to the circumferential feed duct 38 at one of its ends only, there being a wall at its other end so that cooling fluid cannot flow past the supply duct 40 in the circumferential feed duct 38 or back into the supply duct 40 from the circumferential feed duct 38. The circumferential feed duct 38 has rigid portions 42 that are arc-shaped. Adjacent rigid portions 42 are coupled by a flexible portion 44, for example a bellows. The circumferential feed duct 38 is therefore able to expand and contract in response to thermal gradients and to radially grow during operation of the gas turbine engine 10.

The turbine case cooling arrangement 36 also includes an annular array of discrete manifold modules 46 that are arc-shaped and positioned intermediate the circumferential feed duct 38 and the casing 34. Each manifold module 46 has an array of impingement apertures provided in its radially inner surface so that cooling fluid can be ejected from the apertures to impingement cool the intermediate pressure turbine casing 34 radially inwardly of the manifold module 46. For this reason the manifold modules 46 are sometimes known in the art as spray bars. The impingement cooling changes the thermal expansion of the casing 34 to minimise the gap between the inner surface of the casing 34 and the tips of the turbine blades and thereby improve the efficiency of the engine 10.

Each of the manifold modules 46 is coupled to a rigid portion 42 of the circumferential feed duct 38 by an air transfer box 48. Thus cooling fluid is supplied to the turbine case cooling arrangement 36 from the supply port 40 and into the circumferential feed duct 38. The fluid passes through alternate rigid portions 42 and flexible portions 44. A portion of the fluid is diverted from each rigid portion 42 through an air transfer box 48 and into a manifold module 46 to be sprayed at the casing 34 to perform impingement cooling.

In the illustrated turbine case cooling arrangement 36, there are five manifold modules 46. Although there is a small gap between the circumferential ends of adjacent modules 46, this is designed to be minimal whilst accommodating relative movement between the adjacent modules 46 due to engine vibrations or differential thermal expansion. Each manifold module 46 is attached to the casing 34 by a pair of manifold mounting arrangements 50, one at each end of the module 46, as will be described in more detail below.

Figure 3:
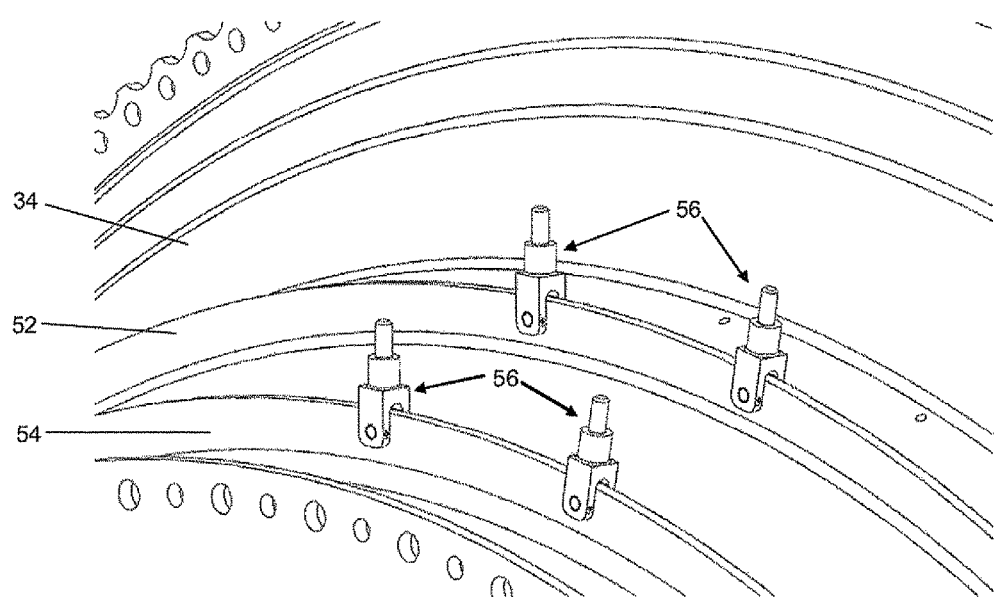
FIG. 3 is a schematic perspective view of part of a turbine casing.

FIG. 3 shows part of the turbine casing 34 in more detail. The casing 34 comprises a pair of annular flanges 52, 54 that extend in parallel around the outside of the casing 34. The axially upstream flange 54 supports the first intermediate pressure (IP1) manifold modules 46 and the axially downstream flange 52 supports the second intermediate pressure (IP2) manifold modules 46. The subsequent description is provided with respect to the downstream flange 52 and manifold modules 46 but it is to be understood that the present invention has equal utility for the upstream flange 54 and manifold modules 46, and for a flange provided on a high pressure turbine casing instead.

Figure 4:
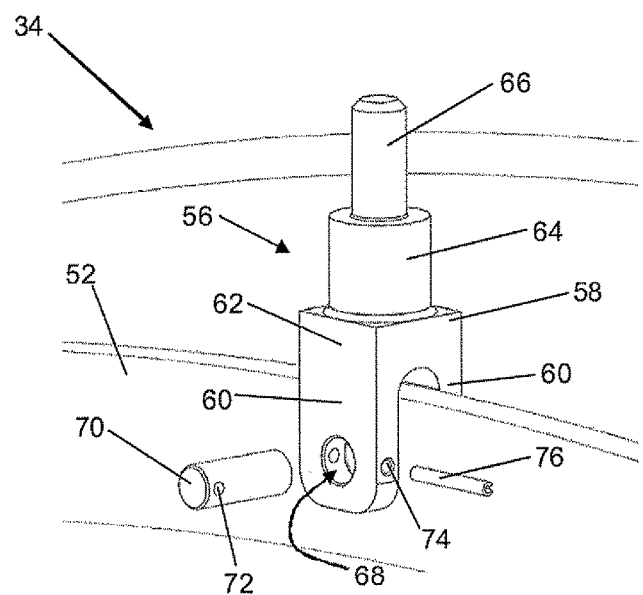
FIG. 4 is an exploded enlargement of a clevis forming part of a manifold mounting arrangement according to the present invention.

Each manifold mounting arrangement 50 according to the present invention comprises a clevis arrangement 56 as shown in greater detail in FIG. 4. The clevis arrangement 56 comprises a clevis 58 that straddles the flange 52. More particularly, the clevis 58 has a pair of parallel lugs 60 that extend one on each axial side of the flange 52. A saddle portion 62 is provided at one end of the lugs 60 to couple them together. The surface of the saddle portion 62 between the lugs 60 is preferably curved and spaced away from the flange 52 when the clevis arrangement 56 is correctly positioned. The clevis 58 further includes a shoulder portion 64 extending from the saddle 62 in a direction away from the lugs 60, and a finger portion 66 extending from the shoulder portion 64 in a direction away from the saddle 62 and lugs 60. The finger portion 66 may be threaded to receive a nut 86. Each lug 60 includes an aperture 68; the apertures 68 in the two lugs 60 being axially aligned.

The clevis arrangement 56 also includes a clevis pin 70 that slides through the apertures 68 and a corresponding aperture in the flange 52. Thus the clevis pin 70 pivotally couples the clevis 58 to the flange 52. The shape of the saddle portion 62 inner surface and its spacing radially from the flange 52 permits the clevis 58 a restricted arc of circumferential movement with the clevis pin 70 as its axis of rotation. The clevis pin 70 comprises an aperture 72 through its barrel, perpendicular to the longitudinal axis of the clevis pin 70 and towards one axial end thereof. A corresponding aperture 74 is provided in one of the lugs 60 that preferably bisects the aperture 68. A locking pin 76, typically a split spring pin, is provided that slots through the apertures 72, 74 to lock the clevis pin 70 in position in the aperture 68 through the lugs 60 and flange 52. The locking pin 76 is arranged such that it occupies a small volume whilst it is inserted through the apertures 72, 74 and expands once in position to lock the clevis pin 70 in place. The clevis arrangement 56 is quick to assemble and has only one tolerance, between the clevis pin 70 and the aperture through the flange 52, that affects the radial position of the shoulder portion 64 and finger portion 66 of the clevis 58.

Figure 5:
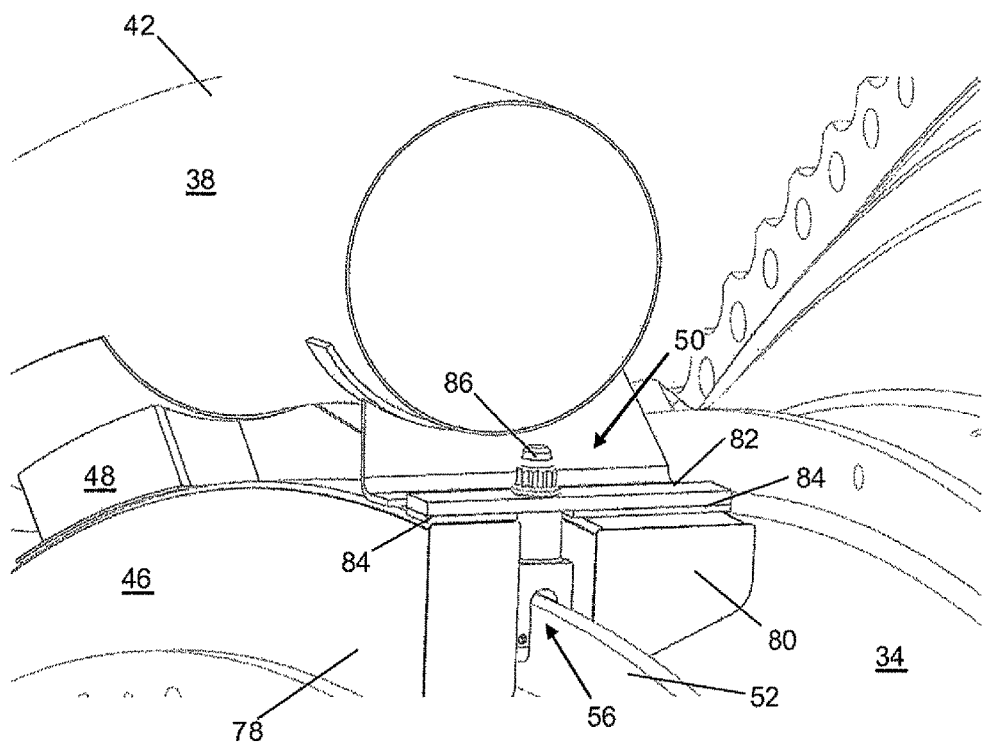
FIG. 5 is a schematic perspective view of the portion V in FIG. 2 of a turbine case cooling arrangement including a manifold mounting arrangement according to the present invention.

An exemplary embodiment of the turbine case cooling arrangement 36 including a manifold mounting arrangement 50 according to the present invention is shown in FIG. 5. As in FIG. 2, the turbine case cooling arrangement 36 comprises a circumferential feed duct 38, of which part of one of the rigid portions 42 is shown, coupled via an air transfer box 48 to a manifold module 46. The manifold module 46 is configured to have a first portion 78 and a second portion 80 that, when the turbine case cooling arrangement 36 is mounted to the casing 34, are positioned one on each axial side of the flange 52.

A manifold mounting arrangement 50 is provided towards each circumferential end of a manifold module 46. The manifold mounting arrangement 50 comprises a clevis arrangement 56 as described with respect to FIG. 4. The first and second portions 78, 80 of the manifold module 46 are configured to straddle the clevis arrangement 56, preferably with a small clearance. The first and second portions 78, 80 may be different sizes and/or shapes in cross-section. The manifold mounting arrangement 50 further comprises a locking bar 82 that includes an aperture configured to receive the finger portion 66 of the clevis 58 therethrough.

For the turbine case cooling arrangement 36, first the clevis arrangement 56 is assembled to the flange 52 of the turbine casing 34. Then the annular array of manifold modules 46 are positioned over the flange 52 and the clevis arrangements 56. Each manifold module 46 comprises a locking bar 82 bonded to each end thereof. The locking bars 82 are preferably welded to the radially outer surface of the manifold module 46 or may be riveted or otherwise secured thereto. The locking bars 82 each comprise an aperture suitable for receiving the finger portion 66 of a clevis 58. Shims 84 may be provided between the locking bar 82 and the radially outer surface of the manifold module 46, to provide a stronger weld, reduce stress or for other reasons. The air transfer boxes 48 and the circumferential feed duct 38 may then be coupled into position or may be integrally formed with or secured to the manifold modules 46. Each locking bar 82 is slotted over the finger portion 66 of one of the devises 58 and seated against the shoulder portion 64. The locking bar 82 is then coupled to the clevis 58 by a nut 86 screwed onto the threaded finger portion 66. Either before or after securing the nuts 86, the flexible portions 44 are coupled between adjacent pairs of rigid portions 42 to form the annular circumferential feed duct 38.

Advantageously each manifold mounting arrangement 50 according to the present invention securely fixes the manifold module 46 to the flange 52 of the turbine casing 34 at a known radial distance. The distance is guaranteed to within a small tolerance because there are fewer clearances than in the prior art arrangement. Thus the manifold mounting arrangement 50 of the present invention does not cause the manifold to press towards the casing 34 in some places and to hang from the casing 34 in other places. Thus the radial spacing of the impingement holes in the manifold modules 46 from the turbine casing 34 is more consistent around the whole circumference than in the prior art. It will be apparent to the skilled reader that the more manifold modules 46 there are, the more parallel to the casing 34 the impingement holes can be but that increasing the number of manifold modules 46 adds weight.

The clevis arrangements 56 remain able to pivot about their clevis pins 70 to a small degree once the manifold modules 46 are coupled to them. This enables the manifold mounting arrangements 50 to pivot slightly during use of the gas turbine engine 10 in order to adjust for thermal expansion, radial growth and other movements of the manifold module 46. Furthermore, there is more manifold surface available for impingement cooling holes than in the prior art because the clevis arrangement 56 does not cover any of the manifold surface, unlike the W-shaped bracket of the prior art. For both these reasons the manifold mounting arrangement 50 of the present invention provides more even cooling flow to the turbine casing 34 and therefore provides more accurate control of the spacing of the turbine blades from the casing 34.

Although the present invention has been discussed with respect to a gas turbine engine 10 for an aircraft, it finds equal utility for an industrial or marine gas turbine engine application. Similarly, it finds utility for both ducted fan gas turbine engines 10 and unducted, propeller gas turbine engines.

Although the manifold mounting arrangement 50 of the present invention has been described with respect to a turbine case cooling arrangement 36 for any of the turbines of a gas turbine engine 10 it finds utility for mounting other manifolds where improved accuracy is required. For example, for mounting an anti-icing supply manifold to a nacelle 30, starter ducting, or environmental cabin system ducting forming part of the engine bleed air system.

It will be apparent to the skilled reader that modifications and variations can be made to the described embodiments within the scope of the claimed invention. For example, the locking bar 82 may be coupled to the clevis 58 by a push-fit connection instead of a threaded nut 86. The locking bar 82 may comprise shaped ends, a shaped aperture or other features to ensure correct orientation and position relative to the first and second portions 78, 80 of the manifold module 46 before welding or riveting thereto. Although two manifold mounting arrangements 50 have been described for each manifold module 46, one at each end, more than two manifold mounting arrangements 50 may be clustered at its ends. This may be required for a relatively heavy manifold arrangement but may require larger tolerances for some of the mounting arrangements 50. The manifold modules 46 may span a pair of adjacent parallel flanges 52, 54 with a manifold mounting arrangement 50 provided on each flange 52, 54 at each end of the manifold module 46.

Instead of a threaded finger portion 66, the clevis may comprise an internally threaded shoulder portion 64 and no finger portion 66. A complementary threaded bolt would then be provided that depends from the locking bar 82 rather than the nut 86. Other methods of coupling the locking bar 82 to the clevis arrangement 56 will be apparent to the skilled reader.

The clevis 58 has been described with two lugs 60 that straddle the flange 52 on the turbine casing 34. Alternatively the clevis 58 may comprise a single lug 60 that is straddled by a pair of relatively close, parallel flanges 52 with the same net effect. Where the turbine casing 34 comprises a pair of flanges 52, 54 that are more widely spaced, the manifold module 46 may be configured to have three chambers that sit one axially outside each flange 52, 54 and one between the two flanges 52, 54 so that the manifold module 46 spans the two flanges 52, 54. There are clevis arrangements 56 coupled to each flange 52, 54 for connection to the locking bars 82.

The invention claimed is:

1. A manifold mounting arrangement for a gas turbine engine, the manifold mounting arrangement comprising:
   a manifold module having first and second ends;
   a clevis arrangement having a clevis configured to straddle a flange and to be pivotally secured to the flange by a clevis pin; and
   a locking bar configured to be coupled to the clevis and to constrain the manifold module relative to the clevis arrangement in the locality of the locking bar,
   wherein the manifold mounting arrangement mounts the manifold module to a part of the gas turbine engine.

2. A manifold mounting arrangement as claimed in claim 1 wherein the clevis arrangement and the locking bar are at the first end of the manifold module and another clevis arrangement and locking bar are at the second end of the manifold module.

3. A manifold mounting arrangement as claimed in claim 1 comprising a plurality of manifold modules.

4. A manifold mounting arrangement as claimed in claim 1 wherein the clevis pin is held to the clevis by a split spring pin.

5. A manifold mounting arrangement as claimed in claim 1 wherein at least a portion of the clevis is threaded and the locking bar is coupled thereto by a threaded nut.

6. A manifold mounting arrangement as claimed in claim 1 wherein the manifold module is configured to have a first portion and a second portion, one on each side of the flange.

7. A manifold mounting arrangement as claimed in claim 6 wherein the locking bar is configured to constrain the first and second portions relative to each other and to the clevis arrangement.

8. A turbine case cooling arrangement mounted to an annular array of manifold mounting arrangements as claimed in claim 1.

9. A turbine case cooling arrangement as claimed in claim 8 further comprising a circumferential feed duct having rigid portions each coupled to a respective manifold module by an air transfer box, adjacent rigid portions coupled by flexible portions, wherein each manifold module is configured to have a first portion and a second portion, one on each side of the flange, that comprise spray bars.

10. A gas turbine engine comprising at least one manifold mounting arrangement, the at least one manifold mounting arrangement comprising:
    a manifold module having first and second ends;
    a clevis arrangement having a clevis configured to straddle a flange and to be pivotally secured to the flange by a clevis pin; and
    a locking bar configured to be coupled to the clevis and to constrain the manifold module relative to the clevis arrangement in the locality of the locking bar,
    wherein the manifold mounting arrangement mounts the manifold module to a part of the gas turbine engine.

11. A gas turbine engine as claimed in claim 10, further comprising a turbine case cooling arrangement mounted to an annular array of the manifold mounting arrangements.

12. A turbine case cooling arrangement comprising:
a turbine case comprising a flange;
a circumferential feed duct having arc-shaped rigid portions each coupled to a manifold module by an air transfer box, adjacent rigid portions coupled by flexible bellows portions; and
at least one manifold mounting arrangement including:
  a clevis arrangement having a clevis that straddles the flange and is pivotally secured to the flange by a clevis pin; and
  a locking bar configured to be coupled to the clevis and to constrain the manifold module relative to the clevis arrangement in the locality of the locking bar, wherein
  said clevis arrangement is located towards a first circumferential end of the manifold module.

13. A turbine case cooling arrangement as claimed in claim 12 wherein the clevis arrangement and the locking bar are at the first end of the manifold module and another clevis arrangement and locking bar are at a second circumferential end of the manifold module.

\* \* \* \* \*